April 24, 1951     E. B. J. PETERSON     2,550,376
ARTIFICIAL FISH BAIT
Filed June 12, 1947
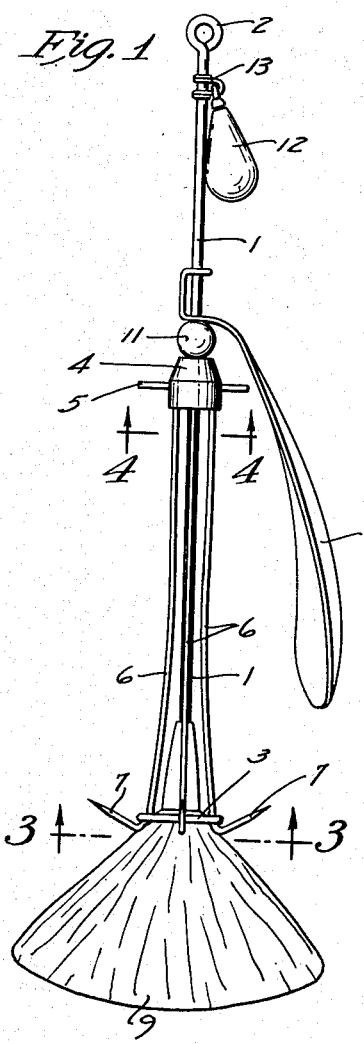
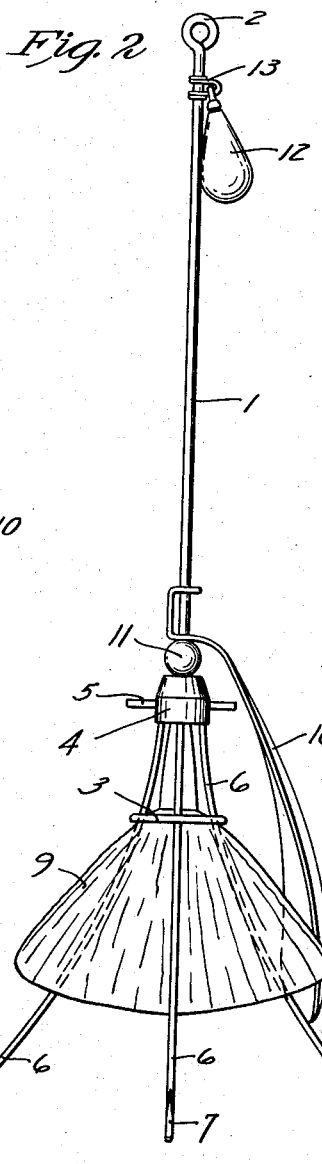
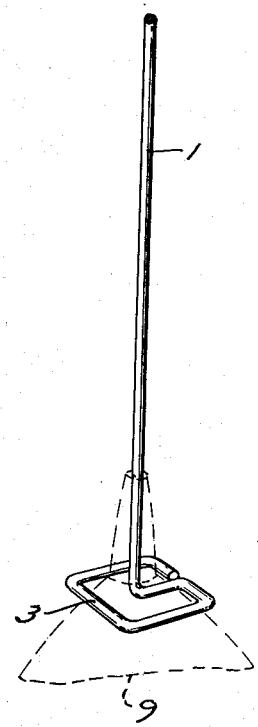
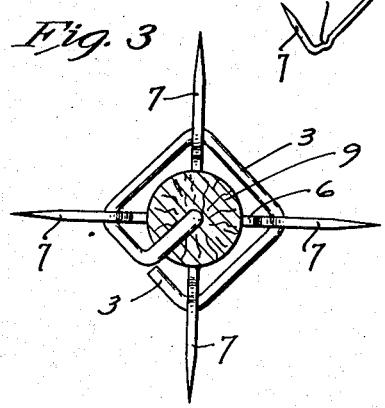
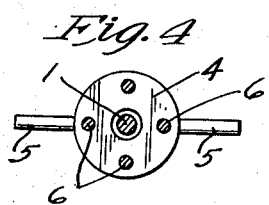
Inventor
Erick B. J. Peterson
By his Attorneys
Merchant + Merchant Patented Apr. 24, 1951

2,550,376

UNITED STATES PATENT OFFICE 2,550,376

ARTIFICIAL FISH BAIT

Erick B. J. Peterson, Minneapolis, Minn.

Application June 12, 1947, Serial No. 754,200

1 Claim. (Cl. 43—35)

My invention relates broadly to fish bait, and more specifically, to artificial fish lures of the type utilizing a plurality of barb-equipped spring arms or hooks which are under tension to fly apart and outwardly, but are normally restrained and combined with a tripping means for releasing and setting the same into action under initial pull by a fish grabbing the bait.

Typical of prior developments incorporating broadly this type of structure, is my earlier Patent 1,957,799, wherein the pull of the fish against the line is utilized to extend the barb-equipped spring arms to a point where they will fly apart and outwardly.

The primary object of my invention is to provide a device of the type above described wherein the barb-equipped spring arms will automatically fly apart and outwardly once they have been tripped from their set, normally restrained position, irrespective of continued pull by the fish.

Another object of my invention is to provide a fish lure of the above type in which the barb-equipped spring arms may be quickly and easily reset.

Another object of my invention is to provide a fish lure which is positive in its action, relatively simple in construction, cheap to manufacture, and can be transported with relative safety.

The above and still further objects of my invention will become apparent from the following detailed specification, appended claim and attached drawings.

Referring to the drawings wherein like characters indicate like parts throughout the several views:

Fig. 1 is a side elevation showing my improved fish lure in a set or restrained position;

Fig. 2 is a view corresponding to Fig. 1 but showing the barb-equipped spring arms in released position;

Fig. 3 is a transverse section of an enlarged view, taken on the line 3—3 of Fig. 1;

Fig. 4 is an enlarged transverse section, taken on the line 4—4 of Fig. 1; and

Fig. 5 is a fragmentary perspective view of a guide-frame equipped stem, utilized in my device.

Referring with greater particularly to the drawings, the numeral 1 indicates an axially arranged stem, preferably in the form of quite heavy wire, and having a loop 2 at one end thereof for the purpose of securing same to fish line. At its outer or free end the stem 1 is formed to provide a preferably rectangular open frame 3 disposed in a plane transversely of the axis of the stem 1. Frame 3 is in the nature of a restraining band or guide means, the purpose of which will hereinafter be described.

A sliding head 4 is mounted for free axial movements on the stem 1 between the loop 2 and the frame 3 thereof. Head 4, preferably, and as shown, is provided with opposed ears 5 to facilitate manual movements of the same to the position shown in Fig. 1. Secured to the outer end of head 4 in circumferentially spaced relationship are a plurality of resilient spring steel arms 6 which, at their outer ends are formed to provide barbs or hooks 7, which project in a direction radially outwardly of the stem 1. The arms 6 are normally bowed from end to end, project through frame 3, and are under tension to fly apart and radially outwardly of the stem 1, to the position indicated in Fig. 2. When the head 4 is moved manually to the position shown in Fig. 1, the diverging arms 6 are forced into a substantially parallel relationship by the guide acting restriction frame 3. It will be observed that each of the resilient arms 6, adjacent the hook ends 7 thereof, is provided with a notch 8, into which the frictionally engaged portion of the frame 3 is adapted to be received when the head 4 and arms 6 are forced into the position indicated in Fig. 1. These notches 8 are of sufficient depth to hold the arms 6 in the set position of Fig. 1 until a fish upsets one or more of the arms, by mouthing or otherwise tampering therewith.

When the arms 6 are upset from their stated condition in the frame 3, they will, by virtue of their normally bowed shape and resilient nature, automatically tend to cam themselves outwardly to the position indicated in Fig. 2.

The benefits of such a fish lure are obvious. Once the fish mouths the hook sufficiently to unseat the arms 6 from the frame 3, the hooks 7 will automatically be thrown outwardly with considerably rapidity and force, thus making it impossible for the fish to shake loose.

In practice, I find it desirable to use the customary tuft of bucktail or feather, indicated by the numeral 9, and which is secured to the stem 1 adjacent the frame 3 and extends outwardly therethrough. A spoon 10 is rotatably mounted on the stem 1 between the loop 2 and the head 4. A ball-like stop or bearing 11 is interposed on the rod 1 between the spoon 10 and the head 4. A weight 12 depends from a hanger 13 fast on the stem 1, adjacent the looped end 2. The weight 12 is particularly effective in preventing rotation of the stem 1 when the bait is being drawn through the water, for rotation would, if allowed to occur, tend to twist the fish line unduly.

In practice, I have found that it is not necessary to provide anchoring barbs, usually provided on fish hooks, because of the fact that the hook-equipped arms 6 will hold and maintain any engagement that they once get with the mouth of the fish. When the fish has been landed and it becomes necessary to disengage the hooks 7 from the mouth of the fish, it is but necessary to retract the arms 6 to the position shown in Fig. 1 by moving the head 4 on the stem 1. This brings the hooks 7 sufficiently close to each other to make it possible to extract the same from the fish's mouth with a minimum of effort and without the use of disgorging instruments.

In actual use, my device has been found to be highly efficient in the accomplishment of the objects stated. While I have illustrated a preferred embodiment of my invention, it will be understood that the same is capable of various modifications within the scope of the invention herewith claimed.

What I claim is:

In a device for the class described, a stem provided with a loop at one end for securing a fish line thereto and at its opposite end with an integrally-formed rectangular guide-acting restriction frame which is co-axial therewith, a head mounted for longitudinal sliding movements between the ends of said stem, diametrically-opposed pairs of hook-equipped arms secured to said head and extending outwardly through said frame one each having sliding engagement with a different corner of said frame, said hook-equipped arms being normally bowed from end to end, the hook-equipped free ends of said arms being under spring tension to fly radially outwardly, whereby said arms acting against said frame tend to move the head longitudinally of said stem to the extreme limit of movement in an outward direction.

ERICK B. J. PETERSON.

REFERENCES CITED

The following references are of record in the file of this patent:

UNITED STATES PATENTS

| Number | Name | Date |
|---|---|---|
| 377,294 | Dietz | Jan. 31, 1888 |
| 387,015 | Smith | July 31, 1888 |
| 1,215,697 | Paulsen | Feb. 13, 1917 |
| 1,259,390 | Gilbert | Mar. 12, 1918 |
| 1,623,870 | Goodgame | Apr. 5, 1927 |
| 1,957,799 | Peterson | May 8, 1934 |